United States Patent

Slaughter et al.

[11] Patent Number: 6,014,669
[45] Date of Patent: Jan. 11, 2000

[54] HIGHLY-AVAILABLE DISTRIBUTED CLUSTER CONFIGURATION DATABASE

[75] Inventors: Gregory L. Slaughter, Palo Alto; Bernard A. Traversat, San Francisco; Robert J. Block, Mountain View, all of Calif.

[73] Assignee: Sun Microsystems, Inc., Palo Alto, Calif.

[21] Appl. No.: 08/954,796

[22] Filed: Oct. 21, 1997

Related U.S. Application Data

[63] Continuation-in-part of application No. 08/942,242, Oct. 1, 1997, abandoned.

[51] Int. Cl.$^7$ .................................................. G06F 17/30
[52] U.S. Cl. .................................. 707/10; 707/1; 707/3; 707/7; 707/101
[58] Field of Search .................................. 707/1, 3, 7, 10, 707/101, 202; 395/200.46, 500.01; 370/255, 395; 455/410; 364/512; 714/4; 435/252.33; 709/216

[56] References Cited

U.S. PATENT DOCUMENTS

| | | | |
|---|---|---|---|
| 5,257,366 | 10/1993 | Adair | 707/3 |
| 5,371,886 | 12/1994 | Britton | 707/1 |
| 5,561,797 | 10/1996 | Gilles | 707/1 |
| 5,715,250 | 2/1998 | Watanabe | 370/395 |
| 5,732,071 | 3/1998 | Saito | 370/355 |
| 5,809,296 | 9/1998 | Yong | 707/101 |
| 5,832,222 | 11/1998 | Dziadosz | 395/200.46 |
| 5,845,279 | 12/1998 | Garofalakis | 707/7 |
| 5,845,292 | 12/1998 | Bohannon | 707/202 |
| 5,870,763 | 2/1999 | Lomet | 707/202 |

FOREIGN PATENT DOCUMENTS

| | | |
|---|---|---|
| 0 458 564 | 11/1991 | European Pat. Off. . |
| 0 578 406 | 1/1994 | European Pat. Off. . |
| 2 256 069 | 11/1992 | United Kingdom . |

OTHER PUBLICATIONS

International Search Report for PCT/US98/20740 mailed Mar. 19, 1999.

*Primary Examiner*—Thomas G. Black
*Assistant Examiner*—Diane D. Mizrath
*Attorney, Agent, or Firm*—Conley, Rose & Tayon, PC; B. Noel Kivlin

[57] ABSTRACT

The cluster configuration database is a distributed configuration database wherein a consistent copy of the configuration database is maintained on each active node of the cluster. Each node in the cluster maintains its own copy of the configuration database and configuration database operations can be performed from any node. Configuration database updates are automatically propagated to each node in a lock-step manner. If any node experiences a failure, the configuration database uses a reconfiguration protocol to insure consistent data in each node of the cluster. The cluster configuration database uses a two-level consistency update framework to insure consistent data among the nodes. Each local configuration database uses a self-contained consistency record to uniquely identify and stamp each copy of the configuration database. The consistency of each individual copy of the configuration database can be verified from the consistency record. Additionally, the cluster configuration database uses a two-phase commit protocol to guarantee the copies of the configuration database are consistent among the nodes. Cluster operations may be performed from any node in the cluster. Cluster operations include restore, checkpoint, update, query, and consistency checking. Because each node maintains a local copy of the configuration database, configuration database queries are local operations and can be performed in parallel among the nodes. Update operations are global operations that involve each active node of the cluster. The cluster configuration database uses a global locking mechanism that implements single write/multiple reader semantics.

42 Claims, 7 Drawing Sheets

1  MY_KEY_fmt:clustname:number_nodes:network_type:node_names

2  MY_KEY:clust0:4:sci:foo,bar,moo,boo

3  MY_KEY:clust1:2:either:foo,bar

4  MY_KEY:clust2:3:sci:foo,bar,moo

5  MY_KEY:clust3:1::foo

6  CCD_CHK:Apr 16 09h49m47 1997:2429:36:4:0,1,2,3:1757

FIG. 6

HIGHLY-AVAILABLE DISTRIBUTED CLUSTER CONFIGURATION DATABASE

This application is a continuation-in-part to currently pending application entitled "Highly-Available Cluster Configuration Database" application Ser. No. 08/942,242 filed Oct. 1, 1997 now abandoned to Gregory L. Slaughter, Bernard A. Traversat, and Robert J. Block.

BACKGROUND OF THE INVENTION

1. Field of the Invention

This invention relates to the field of multiprocessor configuration databases and, more particularly, to system-wide configuration databases for storing global information.

2. Description of the Related Art

Multiprocessor computer systems, also called clusters, include two or more nodes, or processors, which may be employed to perform computing tasks. A particular computing task may be performed upon one node while other nodes perform unrelated computing tasks. Alternately, components of a particular computing task may be distributed among the nodes to decrease the time required to perform the computing task as a whole. Generally speaking, a node is a device configured to perform an operation upon one or more operands to produce a result. The operations are performed in response to an instruction executed by the node. To insure the integrity of the cluster, certain information, such as configuration files, must be maintained consistently among the nodes of the cluster. The integrity of the entire cluster is at risk when inconsistent data is found on different nodes. Unfortunately, these inconsistencies are usually difficult to debug due to the distributed nature of the cluster. Maintaining consistency becomes a more difficult problem as the number of nodes grows and the amount of information that must be consistent among the node increases. Every node must be guaranteed to view the same data and updates need to be propagated among all the nodes in a consistent manner. The updating process can be extremely complex and prone to errors.

One potential solution to maintaining consistent data among the nodes is to have a central configuration database for data that must be shared among the nodes of the cluster. Each node may query or update the central configuration database. For the purposes of this specification, a configuration database is memory or disk storage area for storing configuration parameters, such as parameters to boot a system. Because only one copy of the configuration database exists, the consistency of data is insured. Unfortunately, the node that stores the central configuration database becomes a single point of failure for the cluster. If the node that stores the central configuration database become non-operational, the other nodes of the cluster do not have access to the needed data and the cluster cannot function properly.

Another potential solution to maintaining consistent data is to keep a copy of the central configuration database in each node. The consistency of the central configuration database may be maintained by providing the updates to the data on each node. Unfortunately, manually updating each node is a time consuming and error prone task that is likely to lead to inconsistency. For example, if a node is attempting to update each other node, some nodes may be updated prior to a node crash and other nodes not updated prior to a node crash. Accordingly, the nodes will have inconsistent data. The task of determining which nodes are properly updated and which nodes are not properly updated can be time consuming and difficult.

Conventional implementations of central configuration databases typically have limited ability to recover when inconsistencies are discovered. For example, a conventional central configuration database may check a verification file, such as a checksum file, of each configuration. If the checksums are invalid or the checksums differ between nodes, the central configuration database is invalid and typically no recovery procedure is available to update the copies of the central configuration database. An additional shortcoming of conventional implementations a lack of protection against individual copies of the configuration database being modified by a user. If one node inadvertently modifies data within the local copy of the central configuration database, the data among the nodes is inconsistent which can lead to errors.

Another disadvantage of existing central repository systems is lack of ability to execute a user defined external synchronization command during the update operation.

What is desired is a configuration database that is highly available, i.e., can survive and recover from single node crashes with minimal interruption of cluster services, maintains consistent data among distributed configuration databases, can be administered from any node in a cluster, provides fast and efficient queries and able to store user-defined format data.

SUMMARY OF THE INVENTION

The problems discussed above are in large part solved by a cluster configuration database in accordance with the present invention. The cluster configuration database is a distributed configuration database wherein a consistent copy of the configuration database is maintained at each active node of the cluster. Each node in the cluster maintains its own copy of the configuration database and configuration database operations can be performed from any node. Configuration database updates are automatically propagated to each node in a lock-step manner. If any node experiences a failure, the configuration database uses a reconfiguration protocol to insure consistent data in each node of the cluster. The cluster configuration database uses a two-level consistency framework to insure consistent data among the nodes. Each local copy of the configuration database uses a self-contained consistency record to uniquely identify and stamp each copy of the configuration database. The consistency of each local copy of the configuration database can be verified from the consistency record. Additionally, the cluster configuration database uses a two-phase commit protocol to guarantee the update copies of the configuration database are consistent among the nodes.

Cluster operations may be performed from any node in the cluster. Cluster operations include restore, checkpoint, update, query and consistency checking. Because each node maintains a local copy of the configuration database, configuration database queries are local operations and can be performed in parallel among the nodes. Update operations are global operations that involve each active node of the cluster. The cluster configuration database uses a global locking mechanism that implements single write/multiple reader semantics.

The entries in the cluster configuration database may be user defined. The format of each entry is defined by a key that describes the layout of the entries associated with that key. This format is generic and can be used to store arbitrary data as strings of characters. Wildcard characters may be user defined and can be used to query the configuration database.

BRIEF DESCRIPTION OF THE DRAWINGS

Other objects and advantages of the invention will become apparent upon reading the following detailed description and upon reference to the accompanying drawings in which:

FIG. 6 is a diagram illustrating a configuration database format according to one embodiment of the present invention;

Figure 1:
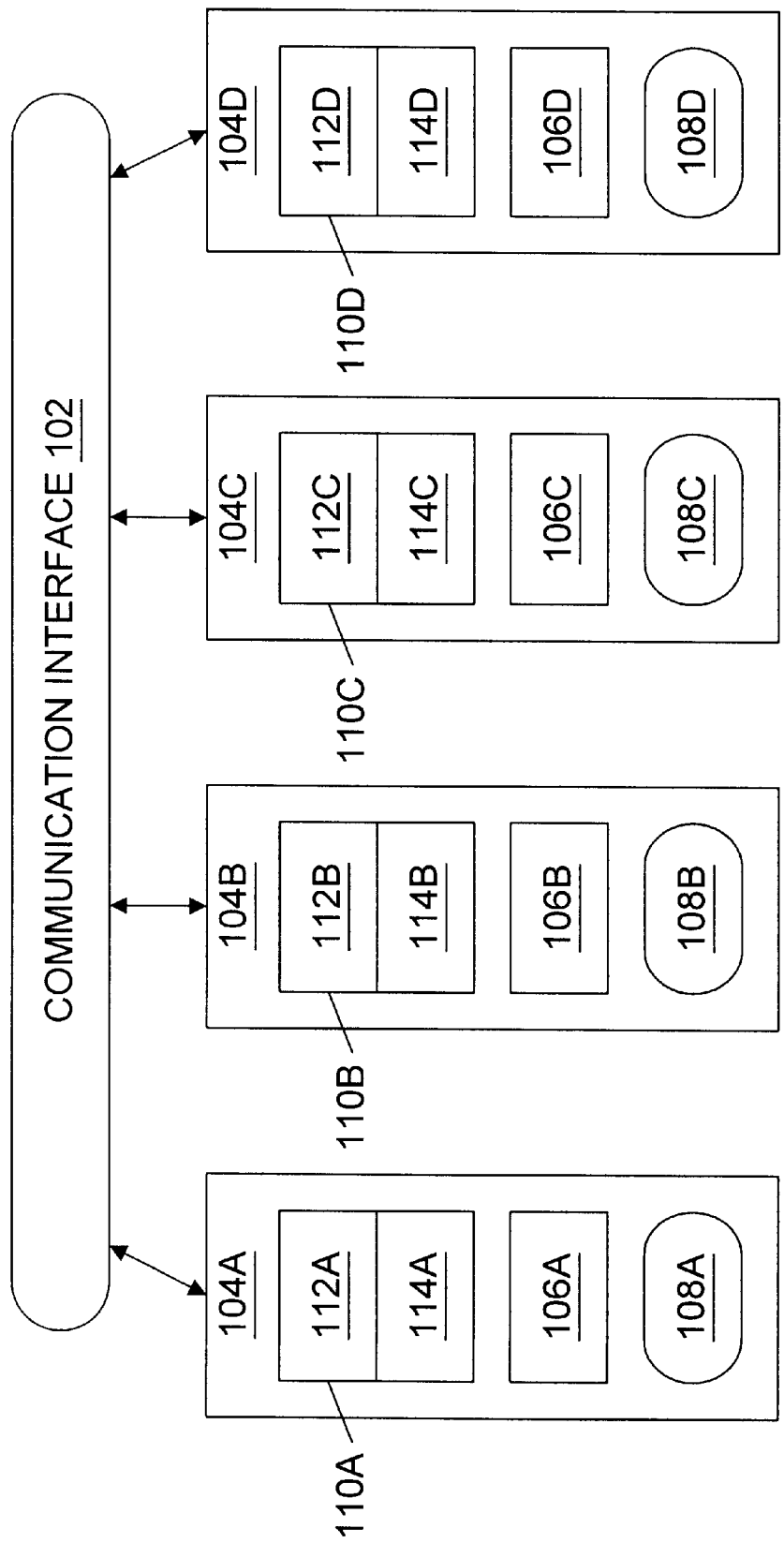
FIG. 1 is a block diagram of a cluster consisting of four nodes according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of a cluster including four nodes is shown according to one embodiment of the present invention. Cluster 100 includes communication interface 102 and four nodes 104A–104D. Each node is coupled to communication interface 102. Communication interface 102 provides a data communication path for transferring data between the nodes. In one embodiment, communication interface 102 is a scaleable coherent interface (SCI) switch. In one particular embodiment, the nodes use a TCP/IP protocol for transferring data between nodes. It is noted that four nodes are shown for illustrative purposes only. One embodiment may employ more or less nodes.

Each node 104 includes a client 108, a cluster server 106 and a cluster configuration database 110. Cluster configuration database 110 includes and initialize database 112 and a dynamic database 114. Client 108 is a software program operating on a node. Elements referred to herein with a particular reference number followed by a letter may be collectively referred to by the reference number alone. For example, cluster servers 106A–106D may be collectively referred to as cluster server 106. Client 108 communicates to cluster server 106 to request cluster configuration database operations such as queries and updates. Cluster server 106 controls the transfer of data between the nodes of cluster 100. Cluster configuration database 110 stores data such as configuration parameters and runtime data that must be maintained consistently across all the nodes to the cluster. Initialize database 112 stores static data that is rarely modified and data required prior to cluster server 106 being operational. Dynamic database 114 stores data that is updated during normal operation.

The data stored in cluster configuration database 110 may be accessed or updated from either the node in which the data is stored or from other nodes. For example, client 108A may query the configuration database to determine the parameters stored in the configuration database. Because each node stores a copy of the configuration database, cluster server 106A may access local cluster configuration database 110A to determine the current value of the parameter. When a parameter is updated within cluster configuration database 110, it is necessary to update each copy of the configuration database on each node.

Cluster 100 relies upon cluster server 106 to determine and maintain a list of the members of the current cluster. For example, cluster 100 may contain many nodes. However, only a portion of those nodes may be active at any one time. Cluster 100 only attempts to maintain consistency among the active nodes. A cluster membership monitor (CMM) determines which clusters are active (i.e., the current cluster membership). The current cluster membership may also be called a consistency domain, i.e., the set of nodes which must have a consistent copy of the cluster configuration database and to which updates must be propagated. In one embodiment, CMM is a management server that maintains a list of active nodes of the cluster. In one embodiment, CMM is separate from cluster server 106 and is queried by cluster server 106 to determine the consistency domain. During an initial set-up phase, each cluster server 106 queries CMM to get the current cluster membership and determine the set of nodes to which it needs to communicate. Cluster server 106 uses this information to establish communications with other servers. Accordingly, it is necessary for CMM to be operational prior to any updates or queries of the cluster configuration database. Initialize database 112, is available to all cluster services before CMM is available. As discussed above, initialize database 112 stores static configuration parameters. These configuration parameters are used by CMM to determine the current cluster membership. Queries to initialize database 112 are enabled before cluster configuration database 110 is valid because it contains static data. Systems that are started before cluster server 106 is enabled use initialize database 112 to store their configuration parameters. For example, in one embodiment, a cluster transport interface subsystem of client 108 uses initialize database 112 to store its network configuration parameters.

When a node voluntarily or involuntarily leaves a cluster or when a node joins a cluster, CMM causes cluster server 106 to perform a reconfiguration algorithm that updates cluster configuration database 110 and maintains consistent data in each node. Reconfiguration is discussed in more detail below in reference to FIG. 4.

A cluster according to the present invention advantageously provides a highly available, consistent configuration database with no single point of administration. The configuration database is designed for high performance, scalability and extensibility. The configuration database is able to recover from any single node crash with minimum interruption of cluster services. The cluster functionality is distributed across all nodes of the cluster. There is no single point of failure. Configuration database updates are propagated automatically to all nodes of the cluster in a lock-step manner. The cluster configuration database can operate with a single node remaining in a cluster. The cluster configuration database uses a recovery protocol to distribute consistent copies of the cluster configuration database to each node of the cluster. In one embodiment, the cluster provides an interface (CCDCTL) to reconfigure itself when one or more nodes join or leave the cluster. The CCDCTL interface is used by CMM to request cluster reconfiguration when the cluster membership changes. In one embodiment, the software controlling the cluster configuration database is a daemon. The communication and update protocols used by the cluster daemon have been designed to handle and recover from node crashes and network communication failures allowing the maximum level of fault tolerance. The cluster configuration database additionally has real time requirements and guarantees the configuration database request and configuration database recoveries are performed in a bounded time by timing-out if the desired operations are not completed within a predefined period of time.

The cluster configuration database quoting the present invention provides a framework to guarantee the consistent replication of information across all nodes of the cluster. Each node in the cluster must have a consistent copy of the cluster configuration database. Discrepancies between the data in the clustered configuration database can induce serious data corruption or service failures in any of the cluster services that store data in the cluster configuration database. The cluster configuration database uses a two-level consistency framework to ensure the consistency of the data. The cluster configuration database first checks local consistency and then checks global consistency. Local consistency is determined using a consistency record to verify the validity of the data and to identify, or stamp each version of the configuration database. For global consistency, or cluster wide consistency, the cluster configuration database uses a two-phase commit protocol to guarantee the consistency of the configuration database after a configuration database update. The nodes store a shadow copy, or back-up copy, of the configuration database to restore the configuration database in case of an update failure on one of the nodes. If the update transaction was unsuccessful, each cluster rolls back the configuration database to the previous state using the shadow copy. When nodes voluntarily or involuntarily leave the cluster, the cluster daemon performs a reconfiguration to consistently replicate information across all the nodes.

Figure 2:
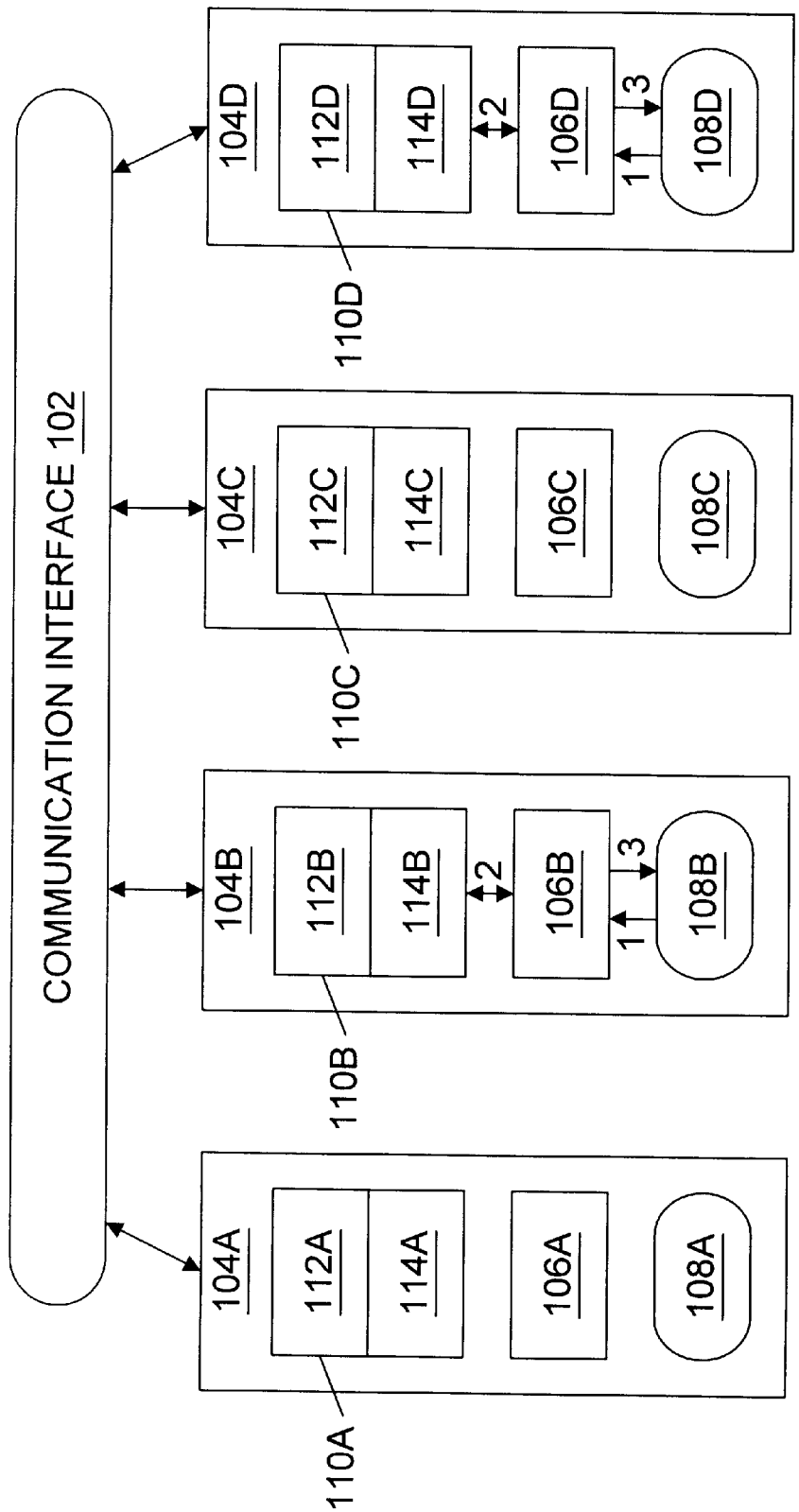
FIG. 2 is a block diagram illustrating a query operation according to one embodiment of the present invention.

Turning now to FIG. 2, a block diagram illustrating a query instruction of cluster configuration database 110 in shown. As shown is FIG. 2, nodes may query cluster configuration database 110 in parallel. In the illustrated embodiment, node 104B and 104D query local copies of cluster configuration database 110 concurrently. When client 108 queries data from cluster configuration database 110, client 108 provides a request to cluster server 106 (step 1). If cluster configuration database 110 is valid, cluster server 108 requests the data from cluster configuration database 110 (step 2). Cluster server 106 then transfers the data to client 108 (step 3). As discussed above, because a consistent copy of cluster configuration database 110 is maintained on each node, a query is a local operation that does not utilize communication interface 102 or interface with the other nodes of cluster 100. As discussed in more detail below, if cluster configuration database 110 is invalid, cluster server 106 will not access the cluster configuration database and returns a status to client 108 indicating that the configuration database in invalid.

Figure 3:
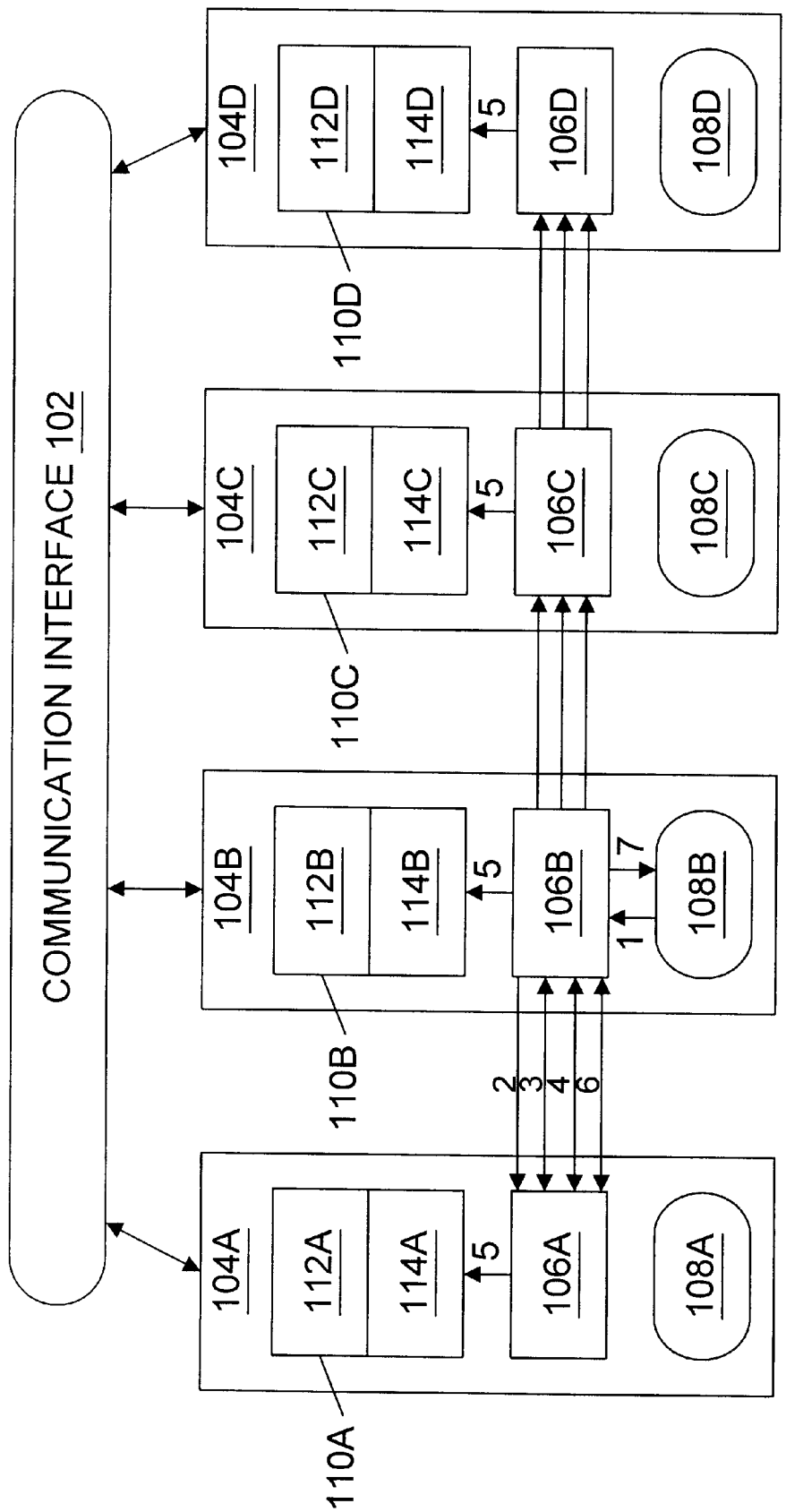
FIG. 3 is block diagram illustrating an update operation according to one embodiment of the present invention.

Turning now to FIG. 3, a block diagram illustrating an update operation is shown according to one embodiment of the present invention. A two-phase commit protocol is implemented to insure consistent data among the nodes of cluster 100 even in the presence of a node failure. The update operation involves a cluster-wide synchronization. In the illustrated embodiment, client 108B issues an update request to cluster server 106B (step 1). Cluster server 106 checks if cluster configuration database 110 is valid and if an update or query is already in progress. If cluster configuration database 110 is valid and no updates or queries are in progress, cluster server 106 forwards the update request to the master cluster server, which is cluster server 106A in the illustrated embodiment (step 2). In one embodiment, the master cluster server is the cluster server of the lowest numbered, or lowest lettered, active node. In the illustrated embodiment, node 104A is the lowest lettered active node of the cluster and accordingly cluster server 106A is the master server.

The master server checks if an update is in progress. To ensure consistent data, cluster 100 does not permit two simultaneous updates to be performed. If no updates are in progress, master server 106A broadcasts a FREEZE_REQ to the other active nodes of cluster 100 (step 3). If master server 106A determines that an update is already in progress, a status message indicating that an update is already in progress is passed to client 108A via client server 106B (step 7). Upon receiving the freeze request, each node checks the state of the local cluster server 106 to determine if a query is in progress. If a query is not in progress, the local cluster server 106 executes a user defined synchronization command and returns a freeze acknowledge (FREEZE_ACK) message to master server 106A (step 3). If the user defined synchronization command fails on any of the nodes, the freeze command fails. User defined synchronization commands are discussed in more detail below. If the freeze command succeeds an all active nodes (i.e., master server 106A receives a FREEZE_ACK message from all nodes), master server 106A broadcasts an update request (UPDATE_REQ) message to all the active nodes of cluster 100 (step 4). In an alternative embodiment, the update is conveyed to other active nodes using a nearest-neighbor propagation scheme (i.e., each node sends to a node with a higher address). The update request message includes the data to update the cluster configuration database. Before performing the update, each node makes a shadow copy of the configuration database in case the update is unsuccessful and the configuration database needs to rolled-back to the existing state. After making a shadow copy, each cluster server 106 performs the requested update to cluster configuration database 110 (step 5). If the local update is successful, each cluster server 106 will return an update acknowledge (UPDATE_ACK) message to master server 106A. If the global update was successful (i.e., master server 106A receives an update acknowledge message from each node), master server 106A outputs an unfreeze request (UNFREEZE_REQ) command indicating that the update is successful and the update is committed (step 6). In one embodiment, a user-defined synchronization command is executed upon receipt of the unfreeze request message. If the global update was unsuccessful, master server 106A outputs an unfreeze request message indicating to the nodes to roll-back the configuration database to the saved shadow copy, and a user defined synchronization command may be executed (step 6). Each node returns and unfreeze acknowledge (UNFREEZE_ACK) command to master server 106A indicating that the user defined synchronization command was executed and either the update was committed or the configuration database was rolled-back (step 6). Master server 106A returns a status to client 108B via cluster server 106B indicating that the update was successful or unsuccessful (step 7).

Figure 4:
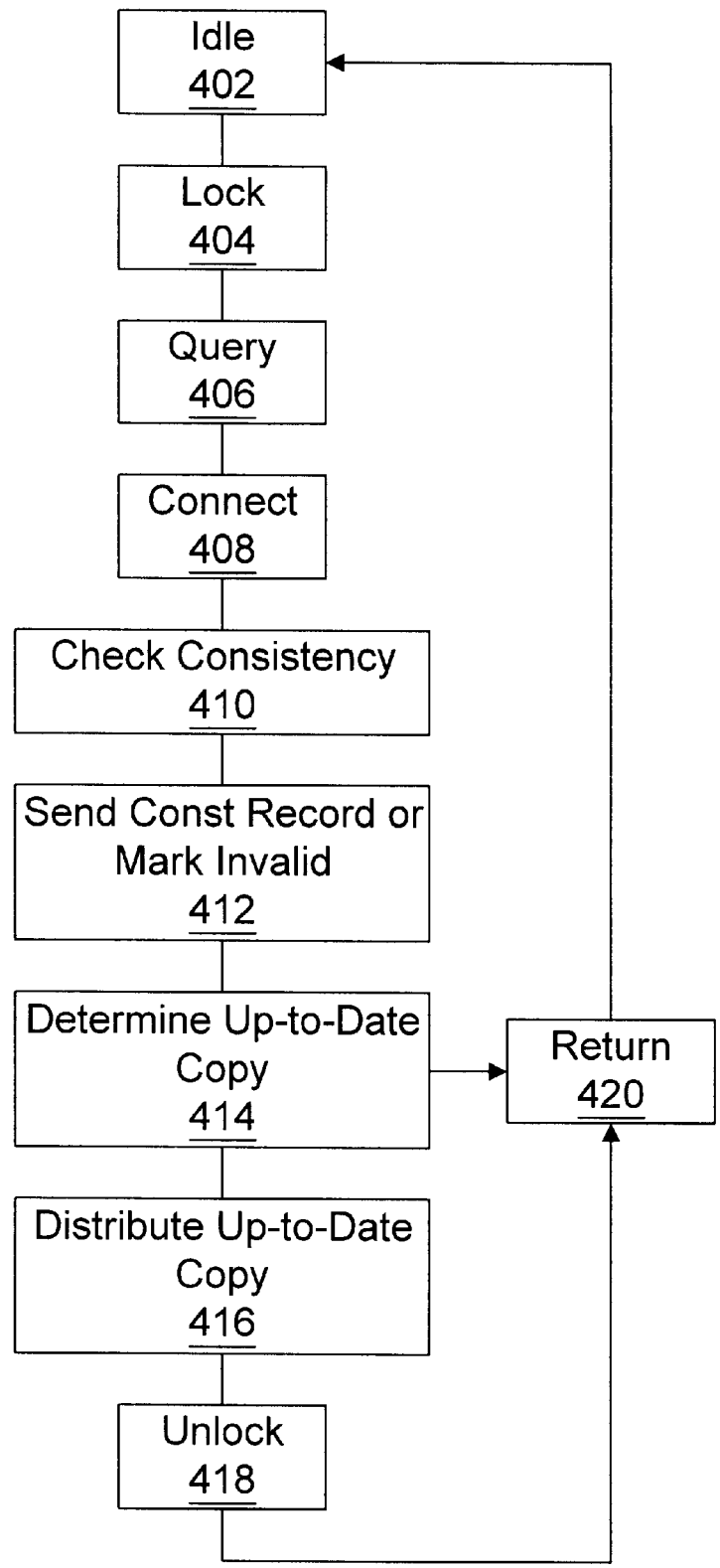
FIG. 4 is a flowchart diagram illustrating reconfiguration of a cluster according to one embodiment of the present invention.

Turning now to FIG. 4, a flowchart diagram of a reconfiguration algorithm according to one embodiment of the present invention is shown. Reconfiguration of cluster configuration database 110 may occur for several reasons. A node may voluntarily or involuntarily join or leave the cluster. The cluster may be restarted after all the nodes have voluntarily or involuntarily left the cluster, or an administrator program may restore the cluster when it is invalid. In each of the above cases, a two-step consistency algorithm is used. The different modes of reconfiguration differ in how the master server determines which copy of the configuration database to distribute to the nodes. For example, if a node is joining an existing cluster, a valid copy of the configuration database on any active node may be copied to the new node. If, however, the reconfiguration algorithm is restarting a cluster, a quorum of active nodes and valid copies of the configuration database are required. Under normal conditions, all copies of the cluster configuration database on active nodes of cluster 100 are the same. However, due to the possibility of a node crash during an update or a new node joining the cluster, a situation may occur where the copies of the cluster configuration database are not consistent. These copies of the cluster configuration database may have valid consistency records but not be identical among the nodes. Consistency records are used to verify that a copy of configuration database has not been corrupted. Consistency records are discussed in more detail below in reference to FIG. 6. The reconfiguration framework determines which copies of the cluster configuration database are valid, which of the valid copies is the most up-to-date and replicates the most up-to-date copy on all nodes. In one embodiment, the reconfiguration algorithm occurs under the control CMM. When CMM detects the membership of cluster 100 changing, it requests a reconfiguration and performs the globally synchronized steps to initialize the connection between the existing nodes and any new nodes and provides consistent data between the nodes.

The configuration algorithm of cluster server 106 is typically in idle state 402 and waits for a start command from the CMM. When a start command is received, the lowest numbered active node of cluster 100 is elected the master server. In step 404, each cluster server 106 outputs a lock command which prevents other transactions from being processed during the reconfiguration under the request of the CMM. In step 406, cluster server 106 of each node queries the CMM for new membership data. The membership data identifies which nodes have joined or left the cluster. In step 408, each cluster server 106 establishes a connection with the other active nodes. In one embodiment, each server establishes the passive side of the TCP/IP socket connections via communication interface 102. In one embodiment, the servers avoid the common port-already-bound TCP/IP error by cycling through a range of ports. Accordingly, the same port is not used in successive configurations and if one port is already bound, the server will begin a new reconfiguration to use the next port number. In one particular embodiment, the port number is incremented after each reconfiguration and reset to the lowest value in the range when a cluster is restarted. In step 410, each cluster server 106 checks the consistency of its local cluster configuration database 110 using a consistency record. If the local copy of cluster configuration database 110 is inconsistent, cluster configuration database 110 is marked invalid and cluster server 106 sends a message to the master server indicating that the cluster configuration database is inconsistent. If the local copy of cluster configuration database 110 is consistent, server 106 sends the consistency record to the master server.

In step 414, the master server determines if a valid copy of cluster configuration database 110 exists and which valid copy of cluster configuration database 110 is the most up-to-date. As discussed in more detail below, if a node is joining an existing cluster, each node should have a valid copy of the configuration database and any valid configuration database copy may be distributed to the new node. Alternatively, if the cluster is restarting, a quorum requirement may be required to determine the correct copy of the cluster configuration database to distribute to the other nodes. If no valid copies of the cluster configuration database are found or, in the case of a restart, if not enough valid copies of the configuration database are found to satisfy the quorum requirements, the cluster configuration database is marked invalid and execution continues at step 420. If a sufficient number of valid copies exist to determine the most up-to-date copy of cluster configuration database 110, then in step 416, the master server outputs an acknowledgment message to each node indicating whether the copy of the cluster configuration database on that node is valid or invalid. Copies that are not the most up-to-date are considered invalid. In step 416, nodes with the most up-to-date copy of the cluster configuration database will be distributed to nodes with invalid copies of the cluster configuration database. In one particular embodiment, a node with a valid copy of cluster configuration database 110 will send the valid copy to the next higher numbered node. Nodes that have an invalid copy of cluster configuration database 110 will initialize cluster configuration database 110 with the valid copy of cluster configuration database 110 and forward the message to the next higher numbered node. When the message reaches a node with an existing valid copy of cluster configuration database 110, the message is returned to the originator of the message and the transfer is completed. Each node then generates a new consistency record with a unique generation number and unique date provided by the master server acknowledgment message.

In step 418, cluster server 106 of each node is unlocked so incoming transactions can be processed. In step 420, the TCP/IP connections are closed in order to discard any stale messages and clean-up the send/receive message queues so new connections may be established. In one embodiment, the command(s) to perform step 420 are issued by CMM. The configuration algorithm then returns to the idle state of step 402 and awaits the beginning of the next reconfiguration cycle.

Figure 5:
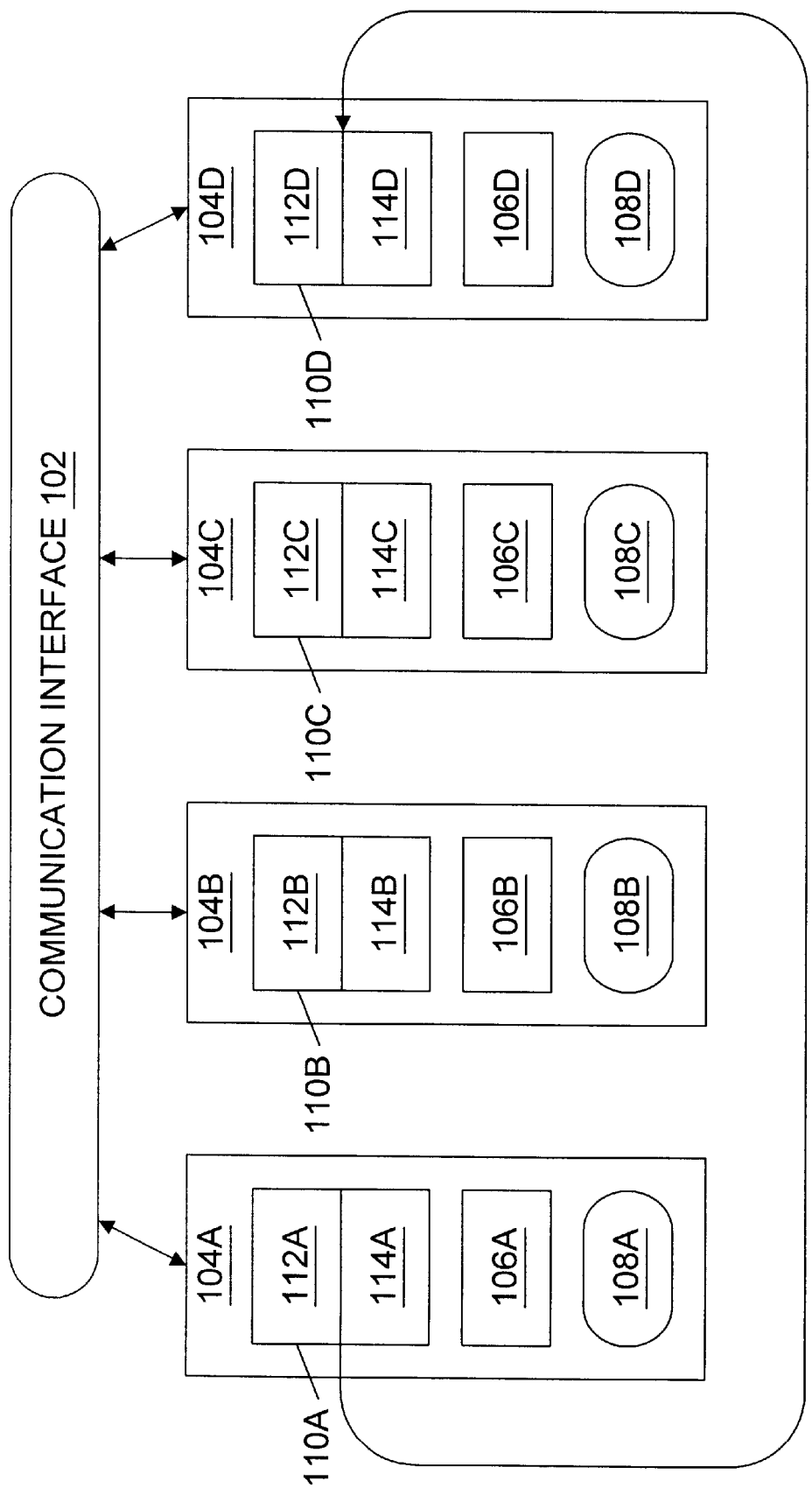
FIG. 5 is a block diagram illustrating joining a node to an existing cluster according to one embodiment of the present invention.

Turning now to FIG. 5, a block diagram illustrating a node joining in cluster is shown according to one embodiment of the present invention. As discussed above in relation to FIG. 4, when a new node joins cluster 100, the CMM membership record is modified and the CALM institutes a reconfiguration sequence. In step 414 of the reconfiguration sequence as described above in reference to FIG. 4, a valid copy of the cluster configuration database is determined from the consistency records received from the nodes. Because each active node has a identical copy of the cluster configuration database, any valid copy of the cluster configuration database received by master server 106A may be used to distribute to the other nodes. In the illustrated embodiment, cluster configuration database 110 from node A is copied to node D.

During a restart, it is possible that nodes have valid copies of the cluster configuration database 110 that are not consistent among the nodes. To address this problem and guarantee that the most up-to-date version of the configuration database is selected during restart, a quorum based restart scheme is employed. The following example illustrates why a generation number associated with cluster configuration database 110 is not sufficient to determine which copy of the configuration database is the most up-to-date. Assume for the purposes of the example below that there are three active nodes (nodes 104A–104C) in cluster 100. The following notation is used: X/Y(N1, N2, N3), where X is the CCM reconfiguration sequence number, Y is the cluster configuration database generation number and (N1, N2, N3) are the members of the cluster forming the consistency domain.

| A | B | C | State/Event |
|---|---|---|---|
| 1/1(A,B,C) | 1/1(A,B,C) | 1/1(A,B,C) | initial state 3 nodes up |
| 1/2(A,B,C) | 1/2(A,B,C) | 1/2(A,B,C) | CCD update, gennum is incremented |
| X | 2/2(B,C) | 2/2(B,C) | node A crashed, B,C reconfigure |
| X | 2/3(B,C) | 2/3(B,C) | CCD update, gennum is incremented |
| X | X | 3/3(B,C) | node B leaves, C reconfigures |
| X | X | X | node C leaves |

In the initial state, all three nodes are active. In state two, the cluster configuration database is updated by one of the active nodes and replicated to all nodes, and the generation number (gennum) is incremented. In state three, node 104A crashes and nodes 104B and 104C are reconfigured to reflect the new cluster membership. In state four, the cluster configuration database is updated and the generation number is incremented. In state five, node B voluntarily leaves the cluster and node C reconfigures to reflect the new cluster membership. In state six, node C leaves the cluster.

If the cluster is restarted via node 104A, the cluster will start with a version of cluster configuration database 110 that is not up-to-date. Node 104A does not have a record of the events that occurred after it crashed. Nodes 104B and 104C may or may not have updated the cluster configuration database. In the illustrated example, nodes 104B and 104C did in fact update the configuration database. Similarly, if the cluster is restarted via node 104B only, the same problem occurs because node 104B does not have a record of what occurred after the node left the cluster. Accordingly, with a single node restarted we cannot unambiguously determine whether a node has the most up-to-date version of cluster configuration database 110. In the illustrated example, all three nodes must be active to determine which copy of cluster configuration database 110 is the most up-to-date.

In one embodiment, a restriction on updates is implemented to reduce the number of nodes required to be active to determine the most up-to-date copy of cluster configuration database 110. This restriction requires that at least a majority of the nodes physically present in the cluster must be active for an update to proceed. By placing this requirement on an update, only half of the nodes physically present in the cluster must be active to restart a cluster. During a cluster restart, a quorum majority voting scheme is used to determine the most up-to-date cluster. If the lower bound of N/2 copies of the same copy of cluster configuration database 110 are found, that copy of cluster configuration database 110 is the most up-to-date and is propagated to the other nodes that do not have a copy of the most up-to-date cluster configuration database. The lower bound of N/2 or more is defined as a quorum majority. N is the total number of nodes physically present in the cluster and the lower bound of N/2 is the whole number equal to or greater than N/2 (for example, if N is 5, the lower bound of N/2 is 3).

If a sufficient number of identical copies are not available, the most up-to-date version of cluster configuration database 110 cannot be determined and cluster configuration database 110 will be marked as invalid. When the cluster configuration database is invalid, query and update requests to dynamic database 114 will fail and an invalid cluster configuration database error will be returned. The cluster configuration database will remain invalid until either one or more nodes join the cluster so a quorum can be reached or an administrator restores the entire configuration database using an administrative copy. Restoring the configuration database entails storing a copy of cluster configuration database 110 to each node from an administrator.

If the administrator restores the configuration database, it is possible that cluster configuration database 110 will be restored with a copy of the cluster configuration database with a generation number lower than the maximum generation number currently in use. To prevent errors in future restart operations, a flag is used to indicate that cluster configuration database 110 was restored via administrative intervention. If this flag is set, the quorum majority updating is overridden, and all nodes must be active for a valid copy of cluster configuration database 110 to be selected during a restart. When the nodes are all active, the flag is reset. As discussed above, the quorum majority is only required in a restart operation. If a node is joining an existing cluster, a valid copy of cluster configuration database 110 from any of the active nodes can be propagated to the joining node.

Turning now to FIG. 6, a format of the cluster configuration database is shown according to one embodiment of the present invention. In the illustrated embodiment, the cluster configuration database uses a column of character strings for data representation. Cluster configuration database 110 uses a key index to group configuration database entries. A format row is associated with each key index to describe the contents of every entry row associated with that key. In one embodiment, the configuration database entries associated with the same key are packed together to expedite searching. Cluster configuration database 10 provides interfaces to create, query and remove an entry row associated with the specific key. Entry rows must match the format of the associated key in order to be entered into the configuration database. Cluster configuration database 110 provides a utility to check the validity of each entry and purge invalid entries from the configuration database.

In the illustrated example, configuration database entries associated with the key "MY_KEY" are shown. Row 1 is a format key that identifies the configuration database format of the key "MY_KEY". The suffix "_fint" indicates the row is a format row. The character ":" is used as a column separator. In one embodiment, the column separator is reserved and cannot be used as a user entry. In the illustrated embodiment, the format row specifies that the key "MY_KEY" has four columns. The first column contains the cluster name, the second column contains the number of nodes in the cluster, the third column identifies the network type, and the fourth column contains a list of node names composing the cluster. Rows 2–5 are examples of entries associated with the key "MY_KEY". Each entry has four columns as specified by the format row. A blank is used if no value is available for one of the columns. For example, in row 5, the network column does not have a value.

Row 2 defines a four-node SCI cluster called clust0. Row 3 defines a two-node Ethernet cluster called clust1. Row 4 defines a three-node SCI node called clust2, etc.

Row 6 is a consistency record for cluster configuration database 110. The consistency record stores a checksum and length of the configuration database. The consistency record is used to validate the local configuration database copy to ensure that the configuration database has not been corrupted. The consistency record contains six columns. The first column indicates the date that configuration database was last updated. The second column indicates a generation number of the last cluster configuration database update. The third column indicates the length in bytes of the configuration database file, the fourth column indicates the conditions under which the configuration database restored. The fifth column indicates the nodes that were the members of the cluster when the configuration database was updated and the sixth column is a checksum field of the configuration database file.

The first column of the consistency record indicates that date the configuration database was last updated. In one embodiment, the cluster configuration database uses the date of the master server as the update date. This approach guarantees that all nodes use the same date to create a new consistency record after an update is performed even if the clocks are not synchronized between the nodes. The second column is a generation number indicating the version of the cluster configuration database. The generation number is incremented each time a new configuration database file is created. The generation number may be used as a tie-breaker to determine which copy of the configuration database is the most up-to-date version if several configuration databases have the same date. The generation number is typically incremented monotomically. Under rare conditions, however, it is possible that the generation number may be non-monotomic. For example, if the cluster configuration database quorum requirement is voluntarily disabled, the generation number may be non-monotomic and the administrator may be responsible for selecting the correct version of the configuration database. As discussed above, the length field indicates the length of the configuration database file in bytes. In one embodiment, the length field does not include the length of the consistency record. Because the consistency record may vary in length depending upon the number of nodes and the checksum length, to determine the length of the configuration database file would require a preliminary step of determining the length of the consistency record. Additionally, when a configuration database copy or checksum operation is performed, the length can be directly accessed. The restore field indicates the conditions under which the configuration database was restored. As discussed above, the cluster configuration database restore utility allows an administrator to restore the contents of the entire configuration database. The restore field indicates whether all nodes were active when the configuration database was restored. In one embodiment, a value of "four" indicates that all nodes were active when the reconfiguration occurred, and a value of "three" indicates that not all the nodes were active at the time of the restore. As discussed above, the membership list includes a list of all nodes that were members of the cluster when the configuration database was updated. The checksum is computed by summing the ASCII value of all characters in the configuration database file.

An entry row can be added, removed or queried from the configuration database. Queries can be performed using a single or multiple column matching scheme. A user defined character may be used to perform wildcard searches to match any strings in a query operation. By default, the "*" character is used as the wildcard character. In one embodiment, the maximum number of columns in a row is 32. In one embodiment, the maximum number of characters in a row is a 1,024.

As mentioned above, the cluster configuration database update protocol allows a user to define external synchronization commands to be executed during the freeze and unfreeze steps of an update operation. For example, a command may be defined to re-allocate functions among the nodes when a node joins or leaves the cluster. The user may define a synchronization command associated with a key using the following format:

sync_row <keyword> [<row>] <CCD file> <#nodes> <nodes up> <nodeid>.

The key specifies the synchronization command associated with the key. In one embodiment, a flag may be set to indicate that no synchronization command is requested. In this embodiment, when the flag is set, the user defined synchronization command is not run during an update.

In one embodiment, the following parameters are passed as arguments of the user defined synchronization command: a key word specifying the update operation, an optional row argument, the location of the cluster configuration database, the number nodes in the cluster, the number of active nodes in the cluster and an identification of the current server. The key word field specifies the operation that invokes the synchronization command. For example, the key word may indicate whether the synchronization command is before or after an add update instruction, before or after a remove update instruction or before or after a restore command. The row is an optional argument that specifies the row involved in an update. This applies to individual row update operations not bulk or restore operations.

The cluster configuration database user defined synchronization command provides a powerful way to control and inform other software components that an update is occurring. Since the commands are run on all nodes, the commands also provide a simple way to perform global node synchronization. A user defined time-out value is set to control the execution of the commands. If the command has not finished executing within the defined time-out period, the server will halt the execution of the command and fail the update operation.

Cluster configuration database 110 provides two interfaces for communicating between configuration database 110 and client 108. Cluster configuration database 110 includes a command line interface (CCDADM) and a library interface (CCDLIB). In one embodiment, both interfaces interact with cluster server 106 via remote procedure calls. The remote procedure calls are protected with time-outs to guarantee bounded time responses. The command line interface is used to interface with dynamic database 114. The command line interface can be run from any node in the cluster and performs cluster-wide operations. Command line operations include verify, restore, checkpoint, quorum enable, purify and convert. The verify option verifies the global consistency of the dynamic database. The consistency record of each node is compared. The copies of the configuration database on each node are then compared to determine whether each node has a consistent a copy of the configuration database. If an inconsistent copy is found, the cluster configuration database is invalidated. The restore option restores the configuration database using a supplied configuration database file. The checkpoint operation is used to store a configuration database to a file. The checkpoint operation may be used to back-up to configuration database. The quorum enable instruction is used to enable or disable the quorum requirements. The purify operation verifies the correct syntax of the configuration database. The convert operation converts an ASCII file into a cluster configuration database file and generates a consistency record at the end of the file.

The library interface provides two interfaces, one for initialization database 112 and one for dynamic database 114. In one embodiment, the library interface is multithread-safe. Examples of static and dynamic library interface operations are shown below.

Static CCDLib Interfaces:
ccd_attach_static: open the Init database.
ccd_dettach_static: close the Init database.
ccd_query_static: query the Init database.

Dynamic CCDLib Interfaces:
ccd_attach: open the dynamic database.
ccd_dettach: close the dynamic database.
ccd_control: setup quorum, retry and timeout options.
ccd_add unique: add a new entry to the database.
ccd_query: query the database.
ccd_remove: remove an entry from the database.
ccd_format: add a new key format to the database.
ccd_remove fint: remove a key format from the database.
ccd_restore: perform a bulk restore for the supplied key.
ccd_perror: convert an error message into an error message string.
ccd_wildchar: set the wildchar character for query.
ccd_retry_error: check if the error condition is retryable.

Figure 7:
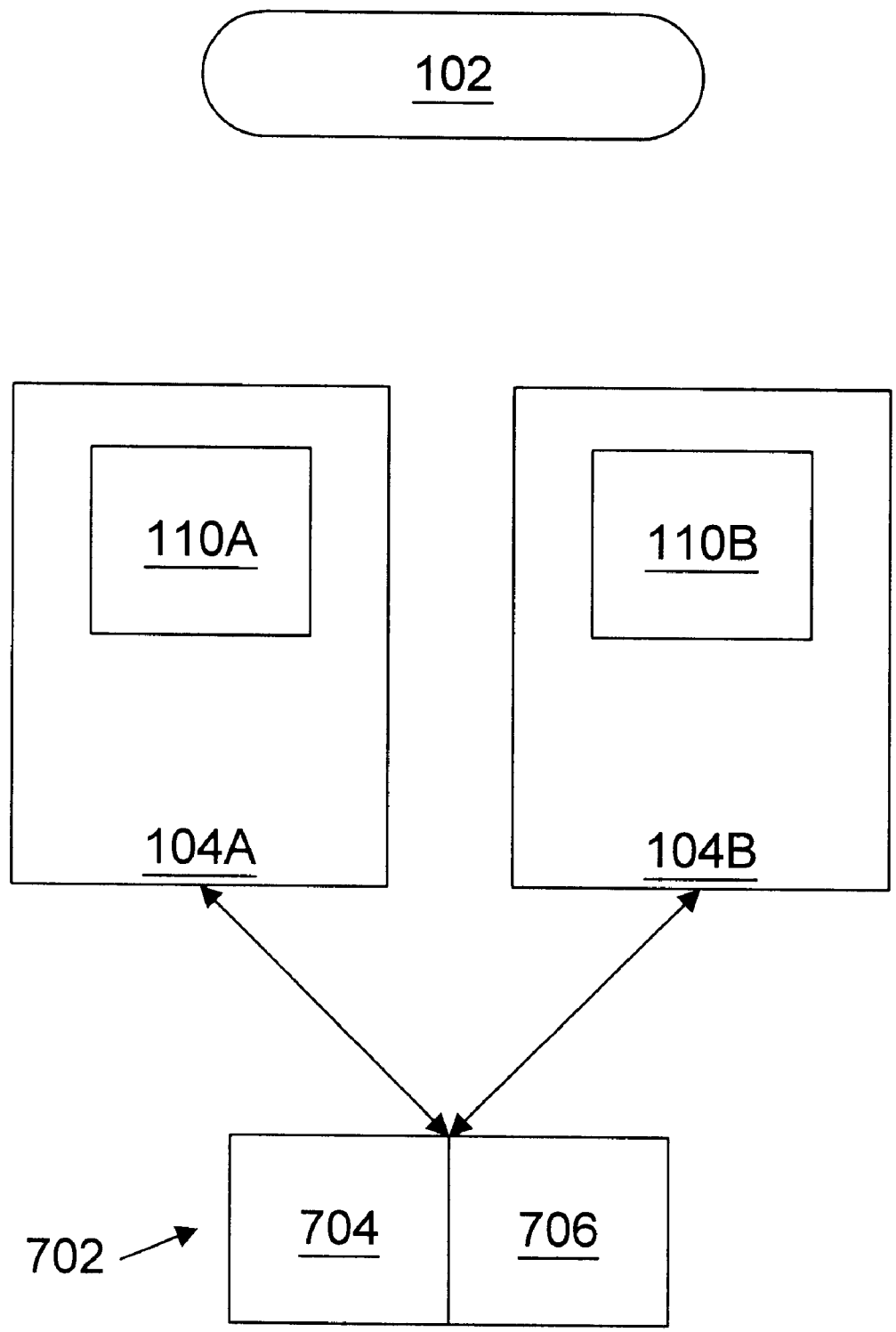
FIG. 7 is a block diagram of a two node cluster according to one embodiment of the present invention.

Turning now to FIG. 7, a two-node cluster configuration is shown according to one embodiment of the present invention. Cluster 700 includes communication interface 102, node 104A, node 104B and storage device 702. In the illustrated embodiment, storage device 702 includes a primary storage device 704 and a secondary storage device 706. Storage device 702 is used to maintain a consistent copy of cluster configuration database 110 when one cluster is inactive. In two node clusters, the previously discussed majority quorum rule would require that both nodes be active for an update to proceed. Because this condition is too restrictive, the cluster configuration database is stored in storage device 702, when only one node is active. Storage device 702 is shared between the nodes, which permits each node to share the configuration database.

When nodes 104A and 104B are active, the cluster configuration database is stored in cluster configuration database 110A and 110B. Updates and queries are performed in the same manner as described above in relation to FIGS. 1–3. When one node leaves the cluster, the copy of the cluster configuration database is stored to storage device 702. Storage device 702 maintains a copy of the cluster configuration database. If the remaining node leaves the cluster, the copy of the cluster configuration database stored in storage device 702 may be used during restart to provide the most up-to-date copy of the cluster configuration database. Without storage device 702, either both nodes would have to be active to restart the cluster or updates could only be performed when both nodes were active.

In one embodiment, storage device 702 includes a primary storage device 704 and a secondary storage device 706. In this embodiment, primary storage device 704 and secondary storage device 706 are configured as mirrored storage devices. Accordingly, storage device 702 is not a single point of failure. If either primary storage device 704 or secondary storage device 706 fails, the remaining, non-failing storage device will store a valid copy of the most up-to-date cluster configuration database. For the purposes of this disclosure, mirrored storage devices are devices that store and maintain copies of the same data. In one particular embodiment, primary storage device 704 and secondary storage device 706 are separate disk devices.

The local copies of the cluster configuration database (110A and 110B) are implemented to improve the performance of the cluster. The local copies of the cluster configuration database allow queries to be performed locally and on both nodes concurrently without interaction.

Storage device 702 is only active when a single node is active. When both nodes are active, local copies of the cluster configuration database are active. When one node leaves the cluster, the local copies are deactivated and storage device 702 is reactivated. Without storage device 702, the quorum requirements require updates to be disabled unless both nodes are active. If the quorum requirement is overridden such that an update can be performed when a single node is active, the cluster configuration database must be manually made consistent before restarting the cluster. This can be accomplished by either first starting the node which has the latest copy of the cluster configuration database or restoring the configuration database after both nodes are active.

It is noted, that the above described implementation may be expanded to clusters with more than two nodes.

Numerous variations and modifications will become apparent to those skilled in the art once the above disclosure is fully appreciated. It is intended that the following claims be interpreted to embrace all such variations and modifications.

What is claimed is:

1. A multi-node computer cluster comprising:
   a first node including a first storage device and a first cluster database server;
   a second node including a second storage device and a second cluster database server; and
   a communication interface coupled to said first node and said second node;
   wherein said first cluster database server and said second cluster database server store a local copy of a cluster database;
   wherein said cluster database includes an initialization database and a dynamic database, wherein said initialization database may be accessed before the cluster database is valid;
   wherein updates to said local copy of said cluster database stored in said first storage device are also made to said local copy of said cluster database stored in said second storage device, and a two-phase protocol ensures that first and second local copies of said databases are updated prior to confirming said update; and
   wherein when said multi-node computer cluster is restarted said local copy of said cluster database stored in said first storage device is compared to said local copy of said cluster database stored in second storage device and a most up-to-date copy of said cluster database is stored to said first and second nodes.

2. The multi-node computer cluster of claim 1 wherein queries to said cluster database by said first node are made to said local copy of said cluster database stored in said first storage device.

3. The multi-node computer cluster of claim 2 wherein said two-phase protocol freezes said first and second nodes, updates said local copies of said cluster database, verifies the integrity of each local copy of said cluster database, and unfreezes said first and second nodes.

4. The multi-node computer cluster of claim 3 wherein said first and second nodes store a shadow copy of said cluster database prior to updating said local copy of said cluster database.

5. The multi-node computer cluster of claim 3 wherein steps of said two-phase commit protocol are run on all active nodes in a step-wise manner when a node joins or leaves said multi-node computer cluster.

6. The multi-node computer cluster of claim 4 wherein said first and second nodes rollback said shadow copies if the integrity of said local copies of said cluster database are not verified.

7. The multi-node computer cluster of claim 6 wherein said first and second nodes rollback said shadow copies if said updating of said local copy of said cluster database is unsuccessful.

8. The multi-node computer cluster of claim 7 wherein when a third node joins said cluster, said first node copies said local copy of said cluster database to said third node.

9. The multi-node computer cluster of claim 8 wherein said first cluster database server and said second cluster database server output a synchronization command when said two-phase protocol freezes or unfreezes said first and said second clusters.

10. The multi-node computer cluster of claim 8 wherein a cluster database server of either said first, second or third nodes can be designated as a master database server.

11. The multi-node computer cluster of claim 9 wherein a restore operation stores a consistent copy of said cluster database to said first and said second nodes.

12. The multi-node computer cluster of claim 11 wherein said first cluster database server and said second cluster database server output a synchronization command before or after a restore operation.

13. The multi-node computer cluster of claim 1 wherein each of said local copies of said cluster database includes a consistency record that stores a data value capable of verifying the integrity of said copy of said local copy of said cluster database.

14. The multi-node computer cluster of claim 13, wherein said consistency record includes a checksum of said local copy of said cluster database, the length of said local copy of said cluster database, and a time stamp.

15. The multi-node computer cluster of claim 14 wherein said comparing of said local copies of said cluster database comprises verifying the integrity of each local copy using said consistency record and comparing valid consistency records to determine said most up-to-date copy.

16. The multi-node computer cluster of claim 15 wherein said cluster database is only updated when a quorum majority of nodes of said multi-node computer cluster are active.

17. The multi-node computer cluster of claim 16 wherein said most up-to-date copy of said cluster database is determined when the lower bound of half or more of said nodes of said multi-node computer cluster are active.

18. A method of storing and maintaining a consistent database in a cluster with multiple nodes comprising:
storing a first copy of said database on a first node;
storing a second copy of said database on a second node;
wherein updates to said database are made to both said first copy and said second copy of said database, and a two-phase protocol ensures that said first copy and said second copy of said database are updated prior to confirming said update; and
wherein said database includes an initialization database and a dynamic database, wherein said initialization database may be accessed before the database is valid.

19. The method of claim 18 wherein when said cluster is restarted, said first copy of said database is compared to said second copy of said database and a most up-to-date copy of said database is stored to said first and second nodes.

20. The method of claim 19 wherein queries to said database by said first node are made to said first copy of said database.

21. The method of claim 20 wherein said two-phase protocol freezes said first and second cluster, updates said first and second copies of said databases, verifies the integrity of each copy of said cluster database, and unfreezes said first and second nodes.

22. The method of claim 21 wherein said first and second nodes store a shadow copy of said database prior to updating said database.

23. The method of claim 21 wherein steps of said two-phase commit protocol are run on all active nodes in a step-wise manner when a node joins or leaves said cluster.

24. The method of claim 22 wherein said first and second nodes rollback said shadow copies if the integrity of said copies of said database are not verified.

25. The method of claim 24 wherein when a third node joins said cluster, said first copy of said database to said third node.

26. The method of claim 25 wherein said first node and said second node execute a synchronization command when said two-phase protocol freezes or unfreezes said first and said second clusters.

27. The method of claim 26 wherein a restore operation stores a consistent copy of said database to said first and said second nodes.

28. The method of claim 27 wherein said first node and said second node output a synchronization command during a restore operation.

29. The method of claim 25 wherein either said first, second or third nodes can be designated as a master server.

30. The method of claim 18 wherein each of said copies of said database include a consistency record that stores a data value capable of verifying the integrity of said local copy of said cluster database.

31. The method of claim 30 wherein said consistency record includes a checksum of said local copy of said cluster database, the length of said local copy of said cluster database, and a time stamp.

32. The method of claim 31 wherein said comparing of said copies of said database comprises verifying the integrity of each copy using said consistency record and comparing valid consistency records to determine said most up-to-date copy.

33. The method of claim 32 wherein said database is only update when a majority of nodes of said cluster are active.

34. The method of claim 33 wherein said most up-to-date copy of said cluster database is determined when lower bound of half or more of said nodes of said cluster are active.

35. A multi-node computer cluster comprising:
a first node including a first storage device and a first cluster database server;
a second node including a second storage device and a second cluster database server; and
a communication interface coupled to said first node and said second node;
wherein said first cluster database server and said second cluster database server store a local copy of a cluster database;
wherein updates to said local copy of said cluster database stored in said first storage device are also made to said local copy of said cluster database stored in said second storage device, and a two-phase protocol ensures that first and second local copies of said databases are updated prior to confirming said update;
wherein when said multi-node computer cluster is restarted said local copy of said cluster database stored in said first storage device is compared to said local copy of said cluster database stored in second storage device and a most up-to-date copy of said cluster database is stored to said first and second nodes;

wherein each of said local copies of said cluster database includes a consistency record that stores a data value capable of verifying the integrity of said copy of said local copy of said cluster database;

wherein said consistency record includes a checksum of said local copy of said cluster database, the length of said local copy of said cluster database, and a time stamp;

wherein said comparing of said local copies of said cluster database comprises verifying the integrity of each local copy using said consistency record and comparing valid consistency records to determine said most up-to-date copy; and wherein said cluster database is only updated when a quorum majority of nodes of said multi-node computer cluster are active.

36. The multi-node computer cluster of claim 35, wherein said most up-to-date copy of said cluster database is determined when the lower bound of half or more of said nodes of said multi-node computer cluster are active.

37. A multi-node computer cluster comprising:

a first node including a first storage device and a first cluster database server;

a second node including a second storage device and a second cluster database server; and a communication interface coupled to said first node and said second node;

wherein said first cluster database server and said second cluster database server store a local copy of a cluster database;

wherein updates to said local copy of said cluster database stored in said first storage device are also made to said local copy of said cluster database stored in said second storage device, and a two-phase protocol ensures that first and second local copies of said databases are updated prior to confirming said update;

wherein when said multi-node computer cluster is restarted said local copy of said cluster database stored in said first storage device is compared to said local copy of said cluster database stored in second storage device and a most up-to-date copy of said cluster database is stored to said first and second nodes;

wherein queries to said cluster database by said first node are made to said local copy of said cluster database stored in said first storage device;

wherein said two-phase protocol freezes said first and second nodes, updates said local copies of said cluster database, verifies the integrity of each local copy of said cluster database, and unfreezes said first and second nodes; and wherein steps of said two-phase commit protocol are run on all active nodes in a step-wise manner when a node joins or leaves said multi-node computer cluster.

38. A multi-node computer cluster comprising:

a first node including a first storage device and a first cluster database server;

a second node including a second storage device and a second cluster database server; and a communication interface coupled to said first node and said second node;

wherein said first cluster database server and said second cluster database server store a local copy of a cluster database;

wherein updates to said local copy of said cluster database stored in said first storage device are also made to said local copy of said cluster database stored in said second storage device, and a two-phase protocol ensures that first and second local copies of said databases are updated prior to confirming said update;

wherein when said multi-node computer cluster is restarted said local copy of said cluster database stored in said first storage device is compared to said local copy of said cluster database stored in second storage device and a most up-to-date copy of said cluster database is stored to said first and second nodes;

wherein queries to said cluster database by said first node are made to said local copy of said cluster database stored in said first storage device;

wherein said two-phase protocol freezes said first and second nodes, updates said local copies of said cluster database, verifies the integrity of each local copy of said cluster database, and unfreezes said first and second nodes;

wherein said first and second nodes store a shadow copy of said cluster database prior to updating said local copy of said cluster database;

wherein said first and second nodes rollback said shadow copies if the integrity of said local copies of said cluster database are not verified;

wherein said first and second nodes rollback said shadow copies if said updating of said local copy of said cluster database is unsuccessful;

wherein when a third node joins said cluster, said first node copies said local copy of said cluster database to said third node; and wherein a cluster database server of either said first, second or third nodes can be designated as a master database server.

39. A method of storing and maintaining a consistent database in a cluster with multiple nodes comprising:

storing a first copy of said database on a first node;

storing a second copy of said database on a second node;

wherein updates to said database are made to both said first copy and said second copy of said database, and a two-phase protocol ensures that said first copy and said second copy of said database are updated prior to confirming said update;

wherein each of said copies of said database include a consistency record that stores a data value capable of verifying the integrity of said local copy of said cluster database;

wherein said consistency record includes a checksum of said local copy of said cluster database, the length of said local copy of said cluster database, and a time stamp; wherein said comparing of said copies of said database comprises verifying the integrity of each copy using said consistency record and comparing valid consistency records to determine said most up-to-date copy; and wherein said database is only updated when a majority of nodes of said cluster are active.

40. The method of claim 39, wherein said most up-to-date copy of said cluster database is determined when lower bound of half or more of said nodes of said cluster are active.

41. A method of storing and maintaining a consistent database in a cluster with multiple nodes comprising:

storing a first copy of said database on a first node;

storing a second copy of said database on a second node;

wherein updates to said database are made to both said first copy and said second copy of said database, and a two-phase protocol ensures that said first copy and said second copy of said database are updated prior to confirming said update;

wherein when said cluster is restarted, said first copy of said database is compared to said second copy of said database and a most up-to-date copy of said database is stored to said first and second nodes;

wherein queries to said database by said first node are made to said first copy of said database;

wherein said two-phase protocol freezes said first and second cluster, updates said first and second copies of said databases, verifies the integrity of each copy of said cluster database, and unfreezes said first and second nodes; and wherein steps of said two-phase commit protocol are run on all active nodes in a step-wise manner when a node joins or leaves said cluster.

42. A method of storing and maintaining a consistent database in a cluster with multiple nodes comprising:

storing a first copy of said database on a first node;

storing a second copy of said database on a second node;

wherein updates to said database are made to both said first copy and said second copy of said database, and a two-phase protocol ensures that said first copy and said second copy of said database are updated prior to confirming said update;

wherein when said cluster is restarted, said first copy of said database is compared to said second copy of said database and a most up-to-date copy of said database is stored to said first and second nodes;

wherein queries to said database by said first node are made to said first copy of said database;

wherein said two-phase protocol freezes said first and second cluster, updates said first and second copies of said databases, verifies the integrity of each copy of said cluster database, and unfreezes said first and second nodes;

wherein said first and second nodes store a shadow copy of said database prior to updating said database;

wherein said first and second nodes rollback said shadow copies if the integrity of said copies of said database are not verified;

wherein when a third node joins said cluster, said first copy of said database to said third node; and wherein either said first, second or third nodes can be designated as a master server.

* * * * *